United States Patent
Tokumoto et al.

(10) Patent No.: US 6,384,177 B1
(45) Date of Patent: May 7, 2002

(54) PROCESS FOR PRODUCING POLYURETHANE AND POLYISOCYANURATE

(75) Inventors: Katsumi Tokumoto, Kudamatsu; Yutaka Tamano, Tokuyama; Shuichi Okuzono, Kudamatsu, all of (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 09/938,488

(22) Filed: Aug. 27, 2001

Related U.S. Application Data

(62) Division of application No. 09/172,016, filed on Oct. 14, 1998, now Pat. No. 6,307,102.

(30) Foreign Application Priority Data

Oct. 15, 1997 (JP) .............................................. 9-281841
Jan. 7, 1998 (JP) .............................................. 10-1476

(51) Int. Cl.$^7$ ........................ C08G 18/18; C08G 18/20
(52) U.S. Cl. ........................ 528/154; 521/128; 521/129; 521/155; 521/159; 521/160; 524/89; 524/92; 524/196; 524/198; 524/251; 524/252; 524/253; 528/52; 528/53; 564/291; 564/295
(58) Field of Search ................................. 521/128, 129, 521/155, 159, 160; 524/89, 92, 196, 198, 251, 252, 253; 528/52, 53, 54; 564/291, 295; 544/404

(56) References Cited

U.S. PATENT DOCUMENTS 4,617,286 A    10/1986   Arai et al. ................... 502/167
5,489,663 A  * 2/1996   Brandt et al. ................. 528/52

FOREIGN PATENT DOCUMENTS

EP    0285431 A2     3/1988
EP    0 478 210   *  4/1992

OTHER PUBLICATIONS

Chem. Abstr. 124:217993, 1996.*
Chem. Abst. 96:181244, 1982.*
Chem. Abst. 75:87752, 1971.*
Database WPI, Section Ch, Week 9729, Derwent Class A26, AN97–316615 XP002089450 & JP 09 124760 A (Sanyo Chem. Inc. Ltd.) May/1997.
Chem. Abstr. 124:217993—1996.
Chem. Abstr. 96:181244—1982.
Chem. Abstr. 75:87752–13 1971.

* cited by examiner

Primary Examiner—Peter O'Sullivan
(74) Attorney, Agent, or Firm—Nixon & Vanderhye

(57) ABSTRACT

An amine catalyst for production of a polyurethane and a polyisocyanurate is provided which comprises a quaternary ammonium compound represented by General Formula (1):

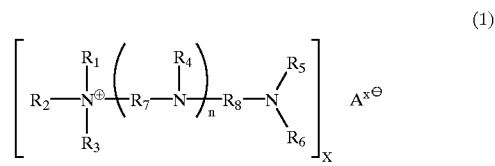

(1)

where $R_1$ to $R_6$ are independently a linear or branched saturated hydrocarbon group of 1 to 4 carbon atoms; $R_7$ and $R_8$ are independently a linear or branched, saturated or unsaturated hydrocarbon group of 2 to 12 carbon atoms; n is a number of 0 to 3, provided that at n=0 any one of $R_1$, $R_2$ and $R_3$, and $R_5$ and/or $R_6$ may be linked together to form a heterocycle, or at n=1, 2, or 3, $R_5$ or $R_6$ and $R_4$ may be linked together to form a heterocycle; A is a carbonate group or an organic acid group; and X is number of 1 to 2. The catalyst has high activity in formation of polyurethane foams and polyisocyanurate foams, having less odor, and producing foams of high fire retardance, having high curability, high retarding effect, and low corrosiveness.

5 Claims, No Drawings

PROCESS FOR PRODUCING POLYURETHANE AND POLYISOCYANURATE

This application is a division of allowed application Ser. No. 09/172,016, filed Oct. 14, 1998 now U.S. Pat. No. 6,307,102.

BACKGROUND OF THE INVENTION

1. Field of the Invention

The present invention relates to an amine catalyst for producing a polyurethane or a polyisocyanurate, and a process for producing a flexible polyurethane foam employing the amine catalyst. More specifically, the present invention relates to a novel catalyst for producing a flexible polyurethane which has high activity for forming polyurethane or polyisocyanurate, giving less odor, giving high fire retardance, and having excellent curability, and also relates to a process for producing a flexible polyurethane foam by use, as a catalyst, of a quaternary ammonium carbonate which has high activity for polyurethane formation, having less odor, and being less corrosive.

2. Description of the Related Art

Polyurethane products and polyisocynurate products are widely used for furniture, automobile interior materials, insulating materials, and so forth. In recent years, the production of these products are required to be improved in productivity, moldability, physical properties, and so forth, and not to cause environmental pollution. Therefore, the catalyst is sought for to achieve high catalytic activity and high functionality.

For example, for improvement of productivity and moldability, a catalyst is demanded which is capable of curing at a high curing rate. For improvement of physical properties, a catalyst is demanded which is effective in improvement of fire retardance of an insulating material as a building material. For environmental protection, an amine catalyst or a blowing agent is demanded which has less odor, and the catalyst should be suitable for the formulation for flon consumption reduction.

A catalyst for formation of polyisocyanurate (trimerization) is exemplified by metal type catalysts such as alkali metal carboxylates, metal alcoholates, metal phenolates, metal hydroxides; tertiary amines; tertiary phosphines; and phosphorus onium salts. Alkali metal carboxylate salts such as potassium acetate, and potassium 2-ethylhexanoate are used owing to high activity of promoting isocyanurate reaction (isocyanurate activity) and effectiveness of improving fire retardance of a rigid foam as a building material. Quaternary ammonium salts of tetraalkylmonoamine type such as quaternary hydroxyalkyltrimethylammonium 2-ethylhexanoate (disclosed in JP-A-52-17484) are used owing to high isocyanurate activity. Furthermore, a method of employing a quaternary ammonium organic acid salt is disclosed in JP-A-9-124760.

Flexible polyurethane foams are widely used for furniture, automobile interior materials, bedding materials, cushion materials, and so forth. In recent years, the production of these polyurethane products are required to be improved in productivity, moldability, physical properties, and so forth, and not to cause environmental pollution. Therefore, the catalyst is sought to achieve high catalytic activity and high functionality.

For example, for improvement of productivity and moldability, a catalyst is demanded which is capable of delaying. For improvement of physical properties, a catalyst is demanded which is effective in improvement of air permeability. For environmental protection, an amine catalyst or a blowing agent is demanded which has less odor, and the catalyst should be suitable for the formulation for flon consumption reduction.

In production of polyurethane foams, the organic carboxylates of a tertiary amine disclosed in JP-A-60-58418 are known to be useful as delayed action catalysts. The delayed action catalyst, which has a low initial activity, is capable of delaying the time of initiation of the foaming reaction after mixing of the source materials, the polyol and the organic isocyanate. Therefore, the handling of the liquid mixture and the flowability of the mixture, and other properties are improved. For example, the source material liquid can be filled sufficiently to the corner of a large mold. This type of catalyst exhibits the catalyst activity by thermally dissociating the tertiary amine compound when the foaming reaction has proceeded to cause rise of the reaction temperature. Consequently, the catalyst activity is greatly increased to allow the produced foam to distribute throughout a complicated mold without defect formation, and thereby the curing is accelerated to shorten the mold-release time of the produced foam and improves the productivity.

However, conventional catalysts for rigid isocyanurate foam production have various disadvantages. For example, conventionally used alkali metal carboxylates and tetraalkylmonoamine type quaternary ammonium salts, although they have relatively high isocyanuration activity, delay the initial reaction remarkably but accelerate the isocyanuration at the later stage of foaming to result in rapid rise of the foaming profile, impair the flowability and broaden the density distribution disadvantageously. Further, the conventional tetraalkylmonoamine type quaternary ammonium salts evolve low-volatile amine by decomposition of the quaternary ammonium salt during the foam formation to aggravate working environment. Further more, when a tertiary amine is combinedly used for accelerating the initial reaction and improving the foam flowability, although it improves the flowability, the tertiary amine generates strong odor, renders the foam more friable, and lowers fire retardance because the isocyanuration is retarded, disadvantageously.

On the other hand, the for polyurethane production catalyst having been employed because of their delayed action has various disadvantages. For example, organic carboxylic acid salts of a tertiary amine are strongly corrosive because of its lower pH, and tend to corrode materials such as a urethane foaming machine to lower the productivity, disadvantageously. This disadvantage can be overcome by decreasing the amount of the organic carboxylic acid to raise the pH, but this offsets the desired delaying effect. In one method, a suitable tertiary amine is mixed to the tertiary amine carboxylate to solve the problem, but the corrosion cannot be completely prevented because of the essential use of an organic carboxylic acid.

SUMMARY OF THE INVENTION

An object of the present invention is to provide a novel amine catalyst for polyurethane and polyisocyanurate production having a high catalyst activity, giving less odor, enabling high fire retardance and giving high curability.

Another object of the present invention is to provide a process for producing a flexible polyurethane foam by use of a catalyst which has sufficiently high delaying effect and is practically non-corrosive.

The amine catalyst of the present invention for production of a polyurethane and a polyisocyanurate comprises a quaternary ammonium compound represented by General Formula (1):

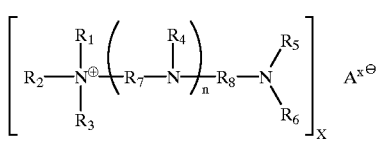

where $R_1$ to $R_6$ are independently a linear or branched saturated hydrocarbon group of 1 to 4 carbon atoms; $R_7$ and $R_8$ are independently a linear or branched, saturated or unsaturated hydrocarbon group of 2 to 12 carbon atoms; n is a number of 0 to 3, provided that at n=o any one of $R_1$, $R_2$ and $R_3$, and $R_5$ and/or $R_6$ may be linked together to form a heterocycle, or at n=1, 2, or 3, $R_5$ or $R_6$ and $R_4$ may be linked together to form a heterocycle; A is a carbonate group or an organic acid group; and X is number of 1 to 2.

The process of the present invention for producing a flexible polyurethane foam by reaction of a polyol and a polyisocyanate in the presence of a catalyst and a blowing agent comprises use of one or more quaternary ammonium carbonate represented by General Formula (2):

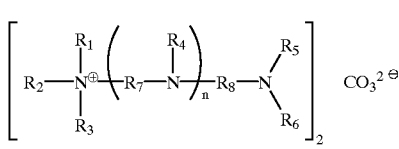

where $R_1$ to $R_8$ are independently a linear or branched, saturated or unsaturated hydrocarbon group of 1 to 12 carbon atoms; n is a number of 0 to 3, provided that at n=o any one of $R_1$, $R_2$ and $R_3$, and $R_5$ and/or $R_6$ may be linked together to form a heterocycle, or at n=1, 2, or 3, $R_5$ or $R_6$, and $R_4$ may be linked together to form a heterocycle.

DETAILED DESCRIPTION OF THE PREFERRED EMBODIMENT

After comprehensive investigation to solve the problems involved in known catalyst, it was found by the inventor of the present invention that a quaternary ammonium salt type of catalyst having a special structure is useful for production of polyurethane and polyisocyanurate, and has extremely high catalyst activity, particularly in polyisocyanurate production, being effective in improvement of flowability and in unifomization of density distribution by accelerating the initial stage of foaming reaction, being effective in improving fire retardance, having a low volatility to give less odor. Further it was also found that among the quaternary ammonium salt type catalyst having a specified structure has significantly high delaying effect in flexible polyurethane foam, and significantly less corrosive. The present invention has accomplished on the basis of the above findings.

In the present invention, among the catalysts represented by General Formula (1), the quaternary ammonium carbonate can be prepared, for example, by reaction of a corresponding tertiary amine with a carbonate diester (e.g., dimethyl carbonate). The organic acid salt of a quaternary ammonium salt can be prepared by anion exchange reaction of a corresponding quaternary ammonium carbonate with an organic acid by removal of carbon dioxide and the alcohol as the byproducts. The producing reaction can be conducted at a temperature ranging from 50 to 150° C. in an autoclave for a time ranging from 1 to 20 hours, preferably in the presence of a reaction solvent to complete the reaction rapidly at a high yield. The reaction solvent is not specially limited, and includes methanol, and ethanol, and the amount thereof is not limited.

The tertiary amine employed for production of the quaternary ammonium carbonate in the present invention include N,N,N',N'-tetramethylethylenediamine, N,N,N',N'-tetramethylpropylenediamine, N,N,N',N'-tetramethylbutanediamine, N,N,N',N",N"-pentamethyldiethylenetriamine, N,N,N',N",N"-pentamethyl-(3-aminopropyl)-ethylenediamine, N,N,N',N",N"-pentamethyldipropylenetriamine, N,N,N',N'-tetramethylguanidine, 1,3,5-tris(N,N-dimethylaminopropyl)hexahydro-s-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, N-methylmorpholine, N-ethylmorpholine, bis(2-dimethylaminoethyl) ether, 1-methylimidazole, 1,2-dimethylimidazole, 1-isobutyl-2-methylimidazole, and 1-dimethylaminopropylimidazole. Of these, specially preferred are N,N,N',N'-tetramethylethylenediamine, N,N,N',N",N"-pentamethyldiethylenetriamine, triethylenediamine, and N,N,N',N'-tetramethylhexamethylenediamine.

The carbonate diester is not specially limited, and includes specifically diethyl carbonate, dimethyl carbonate, and dibutyl carbonate.

The organic acid used for producing an organic acid salt of a quaternary ammonium for the catalyst of the present invention may be any known organic acid, and is not specially limited, including specifically aliphatic and aromatic monocarboxylic acids such as formic acid, acetic acid, 2-ethylhexanoic acid, octanoic acid, and benzoic acid; aliphatic and aromatic dicarboxylic acids such as malonic acid, and terephthalic acid; phenolic compounds, sulfonic acid compounds, and phosphate compounds.

The catalyst comprising the quaternary ammonium salt represented by General Formula (1) of the present invention is useful as the amine catalyst for production of polyurethane and polyisocyanurate. For example, reaction of a polyol and an isocyanate in the presence of a catalyst of the present invention, and optionally a blowing agent and other additive, produces a polyurethane product or a polyisocyanurate product such as a flexible foam, a semirigid foam, a rigid foam, and elastomer.

The polyol employed in the above production may be any known polyetherpolyols, polyetherpolyols, polymer polyols, and the like, and is not specially limited.

Examples of the polyether polyol are alkylene oxide adducts of an active hydrogen compound. The active hydrogen compound includes polyhydric alcohols such as ethyleneglycol, propyleneglycol, 1,4-butanediol, 1,6-hexanediol, diethyleneglycol, triethyleneglycol, dipropyleneglycol, neopentylglycol, glycerin, trimethylolpropane, pentaerythritol, methylglycoside, sorbitol, and sucrose; polyhydric phenols such as pyrogallol, and hydroquinone; bisphenols such as bisphenol A, bisphenol S, bisphenol F, and low condensate of phenol and formaldehyde; aliphatic diamines such as propylenediamine, hexamethylenediamine, ethylenediamine, diethylenetriamine, triethylenetetramine, pentamethylenehexamine, ethanolamine, diethanolamine, triethanolamine, and aminoethylethanolamine; aromatic amines, such as aniline, phenylenediamine, xylylenediamine, methylenedianiline, and diphenyl ether diamine; alicyclic amines such as isophoronediamine, and cyclohexylenediamine; heteroalicyclic amines such as aminoethypiperazine; the aforementioned polyhydric phenols, and Mannich polyols (compounds prepared by reaction of the aforementioned aliphatic amine and formalin). Such an active hydrogen compound may be a mixture of two or more thereof. The alkylene oxide to be added to the active hydrogen compound includes ethylene oxide, propylene oxide, and butylene oxide, and combination of two or more thereof. Of these, ethylene oxide, propylene oxide, and combination thereof are preferred.

The polyesterpolyol includes condensation polyesters prepared by reaction of a polybasic acid such as succinic acid, adipic acid, sebacic acid, maleic acid, dimer acids, and trimellitic acid with a polyhydric alcohol; and polylactone polyol prepared by ring-opening polymerization of ε-caprolactone, or the like.

The polymer polyol includes, for example, those obtained by reaction of the aforementioned polyetherpolyol with an ethylenic unsaturated monomer such as butadiene, acrylonitrile, and styrene in the presence of a radical polymerization catalyst.

Among the aforementioned polyols, for production of flexible polyurethane foam, preferred are polyetherpolyols and polymer polyols, and mixtures thereof. Especially preferred are the ones prepared from glycerin as a source material and having a molecular weight ranging from about 3000 to about 12000. Preferred polymer polyols have a molecular weight ranging from 5000 to 12000. The polyetherpolyol and a polymer polyol are preferably mixed in a ratio ranging from 50:50 to 90:10.

The isocyanate may be any known isocyanate without limitation, including aromatic polyisocyanates; aliphatic polyisocyanates such as isophorone diisocyanate, 1,6-hexamethylene diisocyanate, and 4,4-dicyclohexylmethane diisocyanate; aromatic polyisocyanates such as xylylene diisocyanate, tetramethylxylylene diisocyanate; modifications thereof (carbodiimide-modification, allophanate-modification, urea-modification, biuret-modification, isocyanurate-modification, oxazolidone-modification, etc.); and isocyanate-terminated prepolymers.

The aromatic polyisocyanate includes specifically 2,4- or 2,6-toluene diisocyanate (TDI), crude TDI, diphenyl-methane 2,4'- or 4,4'-diisocyanate (MDI), and polymethylene polyphenyl polyisocyanate (crude MDI).

The aliphatic polyisocyanate includes specifically isophorone diisocyanate, 1,6-hexamethylene diisocyanate, and 4,4-dicyclohexylmethane diisocyanate.

A polyol-isocyanate index [(equivalent number of isocyanate group in isocyanate component per equivalent number of active hydrogen in polyol component)×100] is in the range from about 60 to about 130 in polyurethane product production, and in the range from about 150 to 400 in polyisocyanurate ring-containing product production.

Out of the above isocyanates, mixtures of TDI and MDI are particularly preferred in the production of flexible polyurethane foam. The isocyante index therefor ranges from 70 to 130, but is not limited thereto.

The catalyst of the present invention increases the foam curing rate after the reaction, serving to shorten the mold release time of the foam to improve remarkably the productivity. The catalyst is used usually in an amount ranging from 0.02 to 5 parts, preferably from 0.05 to 3 parts, to 100 parts of the used polyol.

The catalyst of the present invention has high catalytic activity in production of polyisocyanurate products also, and is effective in improving the flowability by promotion of the initial reaction of the foam, narrowing the density distribution, and causes less odor owing to its low volatility. In this case, the catalyst is used usually in an amount ranging from 0.1 to 8%, preferably from 0.5 to 5%, by weight on the basis of the weight of the polyol. With the catalyst of less than 0.1% by weight, the resulting rigid polyisocyanurate foam has insufficient mechanical strength, whereas with the catalyst of more than 8% by weight, the flowability is less in the production of the rigid polyisocyanurate foam.

The catalyst of the present invention, particularly the one represented by General Formula (2), in production of flexible polyurethane foams, is advantageous in its high delaying effect, low corrosiveness, and low odor. The amount of the catalyst ranges usually from 0.01 to 10 parts, preferably from 0.05 to 5 parts, to 100 parts of the used polyol.

The catalyst of the present invention may be used in combination with another catalyst within the range where the catalyst function is not impaired. The combinable catalyst includes known tertiary amines and organic acid salts thereof, quaternary ammonium salts, organometallic compounds, and alkali metal salts or alkaline earth metal salts of known carboxylic acids.

The known tertiary amines include tertiary amines such as triethylenediamine, N,N,N',N'-tetramethylethylenediamine, N,N,N',N'',N''-pentamethyldiethylenetriamine, 1,3,5-tris(N, N-dimethylaminopropyl)hexahydro-s-triazine, N,N,N',N'-tetramethylhexamethylenediamine, and 1,2-dimethylimidazole; alkanolamines such as N,N-dimethylaminoethanol, and N,N,N'-trimethylaminoethylethanol; and amine compounds having primary and secondary amino groups such as dimethylaminopropylamine, and bisdimethylaminopropylamine. These amines are preferred because of high catalytic activity, desirable foaming profile, and improved flowability. However, the tertiary amine are not limited thereto.

The quaternary ammonium salts include known tetraalkylammonium halides such as tetramethylammonium chloride; tetraalkylammonium hydroxides such as tetramethylammonium hydroxide; organic acid salts of tetraalkylammonium such as tetramethyammonium 2-ethylhexanoate, 2-hydroxypropyltrimethylammonium formate, and 2-hydroxypropyltrimethylammnoium 2-ethylhexanoate, but is not limited thereto. Of these, organic acid salts of tetraalkylammonium are particularly preferred because of the high catalytic activity and the high isocyanurate activity.

The known organic metal compounds are not limited specially, and include organic tin compounds and organic lead compounds such as dibutyltin dilaurate, lead octanoate, and lead 2-ethylhexanoate.

The known alkali metal or alkaline earth metal carboxylates include sodium salts and potassium salts of aromatic monocarboxylic acids and aromatic dicarboxylic acids. Of these, alkali metal carboxylates are preferred because of the high catalytic activity and the high nurate activity. More preferable are potassium acetate, potassium octanoate, and potassium 2-ethylhexanoate.

In the production of flexible polyurethane foams, triethylenediamine is particularly preferred as the tertiary amine for the catalyst among the aforementioned catalysts. The triethylenediamine is used in an amount preferably ranging from 0.1 to 2.0 parts by weight to 1.0 part by weight of the quaternary ammonium carbonate. With triethylenediamine of less than 0.1 part by weight, the foam is not formed completely, being liable to cause shrinkage or depression, whereas with triethylenediamine of more than 2.0 parts by weight, the expected delaying effect may not be achieved. The organic metal compound is preferably an organic tin compound, more preferably stannous dioctanoate, and dibutyltin dilaurate. The organic metal compound is used in an amount ranging usually from 0.01 to 5.0 parts, preferably from 0.05 to 3.0 parts by weight to 100 parts by weight of the polyol. With the amount of the organic metal compound of less than 0.05 parts by weight, the produced foam tends to cause cracking, whereas with the amount thereof more than 3.0 parts by weight, the produced foam tends to shrink.

As a blowing agent, a hydrogen atom-containing halogenated hydrocarbon, a low-boiling hydrocarbon and/or water is used as a bowing agent in the production of a polyurethane foam or a polycyanurate foam with the catalyst of the present invention. The hydrogen atom-containing halogenated hydrocarbon as the blowing agent include specifically HCFC type ones such as HCFC-123, HCFC-141b, HCFC-22, and HCFC-142b; HFC type ones such as HFC-134a, HFC-245fa, HFC-245ca, and HFC-236ea; and mixtures of two or more thereof. Of these, preferred are HCFC-141b, HFC-134a, HFC-245fa, and mixtures of two or more thereof. The low-boiling hydrocarbon means usually a hydrocarbon having a boiling point ranging from 0 to 50° C, specifically including propane, butane, pentane, cyclopentane, and mixtures thereof.

The hydrogen atom-containing halogenated hydrocarbon as the blowing agent is used in an amount ranging usually from 5 to 100 parts, preferably from 10 to 80 parts by weight, to 100 parts by weight of the polyol. The low-boiling hydrocarbon as the blowing agent is used in an amount ranging usually from 1 to 40 parts; preferably from 1 to 30 parts by weight, to 100 parts by weight of the polyol. The water as the sole blowing agent is used in an amount ranging usually from 0.5 to 10 parts, preferably from 1 to 8 parts by weight, to 100 parts by weight of the polyol. In the combined use of a hydrogen atom-containing halogenated hydrocarbons and water as the blowing agent, the hydrogen atom-containing halogenated hydrocarbon is used in an amount ranging usually from 1 to 100 parts, preferably from 10 to 80 parts by weight, and water is used in an amount ranging usually from 0.1 to 10 parts, preferably from 0.5 to 8 parts by weight, to 100 parts by weight of the polyol. In the combined use of a low-boiling hydrocarbons and water as the blowing agent, the low-boiling hydrocarbon is used in an amount ranging usually from 1 to 40 parts, preferably from 1 to 30 parts by weight, and water is used in an amount ranging usually from 0.1 to 10 parts, preferably from 0.1 to 5 parts by weight, to 100 parts by weight of the polyol.

In the production of flexible polyurethane foam, water is especially suitable among the aforementioned blowing agents. The amount of water to be used depends on the density of the intended foam product, and is usually not less than 2 parts by weight, preferably in the range from 3.0 to 8.0 parts by weight to 100 parts by weight of the polyol.

The specific application fields of the catalyst of the present invention include furniture cushions, automobile seats, automobile steering wheels made of an integral skin foam, and heat insulating material for refrigerators and building materials.

The quaternary ammonium salt catalyst of the present invention is used in a smaller amount owing to the high catalytic activity, which is effective in reduction of production cost of polyurethanes and polyisocyanurates. This catalyst accelerates the initial reaction, improving the foaming profile and flowability, resulting in narrow density distribution of the produced foam, and high moldability of the foam, advantageously.

The quaternary ammonium salt catalyst of the present invention shortens the foam curing time after the reaction of polyurethane production to shorten the mold release time, which is effective in improvement of productivity.

The isocyanurate foam produced by use of the quaternary ammonium catalyst of the present invention exudes only little odor, which improves remarkably the working environment in the foam production and decreases the residual odor in the foam products. Furthermore, the product has higher fire retardance, less friability of the foam surface, and lower thermal conductivity, advantageously.

The catalyst of the present invention has further advantages in flexible polyurethane foam production as follows. The quaternary ammonium carbonate represented by General Formula (2) is used in a small amount owing to its high activity, and is effective in reduction of polyurethane product cost. The catalyst has a low initial activity, so that the time of initiation of foam formation reaction can be delayed after the mixing of the polyol and the organic isocyanate as the source materials, improving handleability and flowability of the source liquid mixture to allow it to flow to corners of a large mold.

The quaternary ammonium carbonate represented by General Formula (2) develops the catalytic activity when the foam formation reaction has proceeded to result in temperature rise. Consequently, the catalyst activity is greatly increased to allow the foam formed by the foaming reaction to flow into a complicated mold entirely, and the curing is accelerated to shorten the foam release time to improve remarkably the productivity.

The foam products produced according to the present invention has a lower density and has excellent air permeability.

Further, the quaternary ammonium carbonate represented by General Formula (2) exudes only little odor, which improves remarkably the working environment in the foam production and exuding little residual odor in the foam products.

Furthermore, the quaternary ammonium carbonate represented by General Formula (2) is extremely less corrosive to metal materials, causing no corrosion of polyurethane production equipment such as a catalyst storage tank, and a foam formation apparatus, thus improving the productivity.

The present invention is described more specifically by reference to example and comparative examples without limiting to the invention thereto in any way.

[Catalyst Production]

Production Example 1

Into an autoclave equipped with a stirrer, were placed N,N,N',N",N"-pentamethyldiethylenetriamine (1 mol), dimethyl carbonate (1.5 mol), and methanol as a solvent (2.0 mol). The mixture was allowed to react at a reaction temperature of 110° C. for 12 hours to obtain a solution of the product in methanol. The unreacted dimethyl carbonate and the methanol were distilled off to obtain the intended product. The product was a viscous liquid, and was found to be mainly composed of bis(N-(3,6-trimethyl-3,6-diazaheptyl)-N,N,N-trimethylammonium) carbonate by $^{13}$C-NMR and $^{1}$H-NMR. This product is hereinafter referred to as Catalyst A.

Production Example 2

A product mainly composed of bis(N-(2-dimethylaminoethyl)-N,N,N-(trimethylammonium) carbonate was prepared in the same manner as in Production Example 1 except that N,N,N',N'-tetramethylethylenediamine (1 mol) was used in place of N,N,N',N'',N''-pentamethyldiethylenetriamine (1 mol). This product is hereinafter referred to as Catalyst B.

Production Example 3

A product mainly composed of bis(1-methyl-1-azonia-8-azabicyclo[2.2.2]octane) carbonate was prepared in the same manner as in Production Example 1 except that triethylenediamine (1 mol) was used in place of N,N,N',N'',N''-pentamethyldiethylenetriamine (1 mol). This product is hereinafter referred to as Catalyst C.

Production Example 4

Into an autoclave equipped with a stirrer, were placed N,N,N',N'-tetramethylethylenediamine (1 mol), dimethyl carbonate (1.5 mol), and methanol (2.0 mol) as a solvent. The mixture was allowed to react at a reaction temperature of 110° C. for 12 hours to obtain a solution of the product in methanol. Thereto, 2-ethyl hexanoate (1 mol) was added. Then by-product carbon dioxide and the methanol were removed to obtain the intended product, which was mainly composed of bis(N-(2-dimethylaminoethyl)-N,N,N-(trimethylammonium) 2-ethylhexanoate. This product is hereinafter referred to as Catalyst D.

Production Example 5

A product mainly composed of bis(N,N-dimethylaminohexamethylene-N'-trimethylammonium) carbonate was prepared in the same manner as in Production Example 1 except that N,N,N',N'-tetramethylhexamethylenediamine (1 mol) was used in place of N,N,N',N'',N''-pentamethyldiethylenetriamine (1 mol). This product is hereinafter referred to as Catalyst E.

[Production of Polyisocyanurate Product]

EXAMPLES 1–4

Rigid isocyanurate foams were prepared with formulations of the polyol and the polyisocyanate shown in Table 1 (isocyanate index: 200) by using respectively Catalysts A, B,.C, and D produced in Production Examples 1–4, and a blowing agent and a foam stabilizer as shown in Table 1. The products were tested and evaluated for the reactivity (cream time, gel time, and rise time) of the rigid isocyanurate foam, the flowability (density, moldability, and density distribution) of the molded foam product, the fire retardance (oxygen index, and smoking), the friability, the thermal conductivity, and the residual catalyst odor. Table 1 shows the evaluation results.

Table 1 shows that the quaternary ammonium salt catalyst of the present invention has high catalytic activity, accelerates initial reaction (cream time), and gives a smooth foaming profile. Further, the catalyst exudes less odor, thereby improving the working environment in foam production, and leaving no residual odor in the final foam products. The obtained foam has excellent moldability, narrow density distribution, high flowability, high oxygen index, less smoking property, and high fire retardance. The surface of the obtained foam has a low friability and a low thermal conductivity.

Comparative Examples 1–3

Foams were prepared in the same manner as in Example 1 except that conventional isocyanurate catalysts were used as shown in formulations in Table 1. Table 1 also shows the evaluation results.

In Comparative Example 1, the used conventional quaternary ammonium salt catalyst had low catalytic activity, and should be used in a larger amount. The produced foam exuded strong residual odor.

In Comparative Example 2, the used conventional quaternary ammonium salt catalyst gave a short cream time, and a smooth foaming profile, but the catalytic activity was low and the catalyst should be used in a larger amount. The produced foam exuded strong remaining odor.

In Comparative Example 3, the used conventional quaternary ammonium salt catalyst had low catalytic activity, and should be used in a larger amount, requiring a longer cream time and giving a rapid foaming profile. The resulting foam had a broad density distribution, and poor moldability. In the fire retardance test, the resulting foam had a relatively high oxygen index, but smoke generation is significant with unsatisfactory balance of the fire retardance. The surface of the obtained foam has a high friability and a high thermal conductivity.

[Production of Flexible Polyurethane Foam Product]

EXAMPLES 5–8

Flexible isocyanurate foams were prepared with formulations of the polyol and the polyisocyanate shown in Table 2 (isocyanate index: 105) by using respectively Catalysts A, B, C, and E produced in Production Examples 1–3, and 5, and a blowing agent and a foam stabilizer as shown in Table 2. The products were tested and evaluated for the reactivity (cream time, gel time, and rise time) of the flexible isocyanurate foam, the delaying effect (elongation in seconds of cream time of the respective catalyst in comparison with Catalyst L33 as the reference), and the properties (density, and air permeability) of the foam products. Table 2 shows the evaluation results.

Table 2 shows that the quaternary ammonium salt catalysts of the present invention enable delaying of the initial reaction (cream time). The catalysts corrode only little the metallic materials, and give a foam product having a low density and a high air-permeability. Further, the catalyst exudes less odor, thereby improving the working environment in foam production, and leaving no residual odor in the final foam products.

Comparative Examples 4–5

Foams were prepared in the same manner as in Example 5 except that conventional catalysts were used as shown in formulations in Table 2. Table 2 also shows the evaluation results.

In Comparative Example 4, the used conventional tertiary amine catalyst did not delay the cream time for the same gel time.

In Comparative Example 5, the used conventional catalyst of the organic acid salt of tertiary amine delayed the cream time for the same gel time, but the catalytic activity was low and the catalyst should be used in a larger amount. The organic carboxylic acid contained in the catalyst caused remarkable corrosion of metal materials.

What is claimed is:

1. A process for producing a polyurethane and an isocyanate in the presence of a catalyst wherein the catalyst is an amine catalyst comprising a quaternary ammonium compound represented by general formula (1):

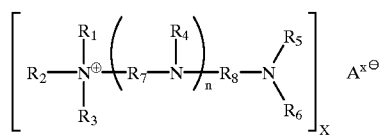

(1)

where $R_1$ to $R_6$ are independently a linear or branched saturated hydrocarbon group of 1 to 4 carbon atoms; $R_7$ and $R_8$ are independently a linear or branched, saturated or unsaturated hydrocarbon group of 2 to 12 carbon atoms; n is a number of 0 to 3, provided that when n=0 any one of $R_1$, $R_2$ and $R_3$, and $R_5$ and/or $R_6$ may be linked together to form a heterocycle, or when n=1, 2, or 3, $R_5$ or $R_6$ and $R_4$ may be linked together to form a heterocycle; A is a carbonate group or an organic acid group; and X is number of 1 or 2.

2. A process for producing a polyurethane comprising a quaternary ammonium compound represented by general formula (2):

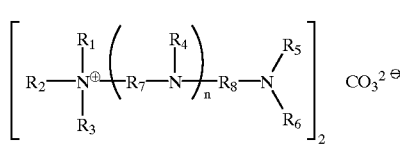

(2)

where $R_1$ to $R_6$ are independently a linear or branched saturated hydrocarbon group of 1 to 4 carbon atoms; $R_7$ and $R_8$ are independently a linear or branched, saturated or unsaturated hydrocarbon group of 2 to 12 carbon atoms; n is a number of 0 to 3, provided that when n=0 any one of $R_1$, $R_2$ and $R_3$, and $R_5$ and/or $R_6$ may be linked together to form a heterocycle, or when n=1, 2, or 3, $R_5$ or $R_6$ and $R_4$ may be linked together to form a heterocycle.

3. A process for producing a polyurethane or a polyisocyanurate comprising an organic acid salt of a quaternary ammonium produced by reaction of an organic acid with a quaternary ammonium carbonate prepared by reaction of a tertiary amine selected from the group consisting of:

N,N,N',N'-tetramethylethylenediamine,

N,N,N',N'-tetramethylpropylenediamine,

N,N,N',N'-tetramethylbutanediamine,

N,N,N',N", N"-pentamethyldiethylenetriamine,

N,N,N',N",N"-pentamethyl-(3-aminopropyl)-ethylenediamine,

N,N,N',N",N"-pentamethyldipropylenetriamine,

N,N,N',N'-tetramethylguanidine,

N,N,N',N'-tetramethylhexamethylenediamine, and

Bis(2-dimethylaminoethyl)ether, with a carbonate diester.

4. A process for producing a flexible polyurethane foam by reaction of a polyol and a polyisocyanate in the presence of a catalyst and a blowing agent, wherein one or more of the quaternary ammonium carbonate set forth in claim 2 is used as a catalyst.

5. A process for producing a flexible polyurethane foam by reaction of a polyol and a polyisocyanate in the presence of a catalyst and a blowing agent, wherein a combination of the quaternary ammonium carbonate as defined in claim 2 and triethylendiamine is used as the catalyst.

* * * * *